United States Patent [19]

Coleman

[11] Patent Number: 4,513,350
[45] Date of Patent: Apr. 23, 1985

[54] MONOLITHIC CERAMIC CAPACITOR AND METHOD FOR MANUFACTURING TO PREDETERMINED CAPACITY VALUE

[75] Inventor: James H. Coleman, Wichita Falls, Tex.

[73] Assignee: Sprague Electric Company, North Adams, Mass.

[21] Appl. No.: 576,497

[22] Filed: Feb. 2, 1984

[51] Int. Cl.$^3$ .................... H01G 3/07; H01G 3/26
[52] U.S. Cl. ................................ 361/321; 29/25.42
[58] Field of Search .............. 361/320, 321; 29/25.42

[56] References Cited

U.S. PATENT DOCUMENTS

| | | | |
|---|---|---|---|
| 3,456,170 | 7/1969 | Hatch | 317/258 |
| 3,586,933 | 6/1971 | Bonini | 317/261 |
| 3,617,834 | 11/1971 | Rayburn | 317/261 |
| 3,648,132 | 3/1972 | Rayburn | 29/25.42 X |
| 3,721,871 | 3/1973 | Heron | 361/321 X |
| 3,896,354 | 7/1975 | Coleman | 317/258 |
| 4,247,881 | 1/1981 | Coleman | 361/302 |

Primary Examiner—Donald A. Griffin

[57] ABSTRACT

Monolithic ceramic capacitors are made by repeatedly passing a substrate through a falling sheet of a green-ceramic slurry, heating the substrate to dry each slurry coating before the next, on at least one dried coating screen printing a matrix of electroding-ink-film pairs and on an adjacent dried coating screen printing a matrix of electroding-ink-film patches. Each of the patches are registered over one pair of the films to form an area of overlap with one film of the one pair that is greater than the area of overlap formed with the other film of the one pair. A relatively large change in the adjustment of this registration advantageously produces a small change in the overall capacitance of the finished capacitor as measured between each pair of buried film electrodes. The final steps in the method include dicing the green-ceramic cake into bodies of rectangular profile, firing the bodies to maturity and applying conductive terminals to the body ends for contacting the films of the pairs.

15 Claims, 6 Drawing Figures

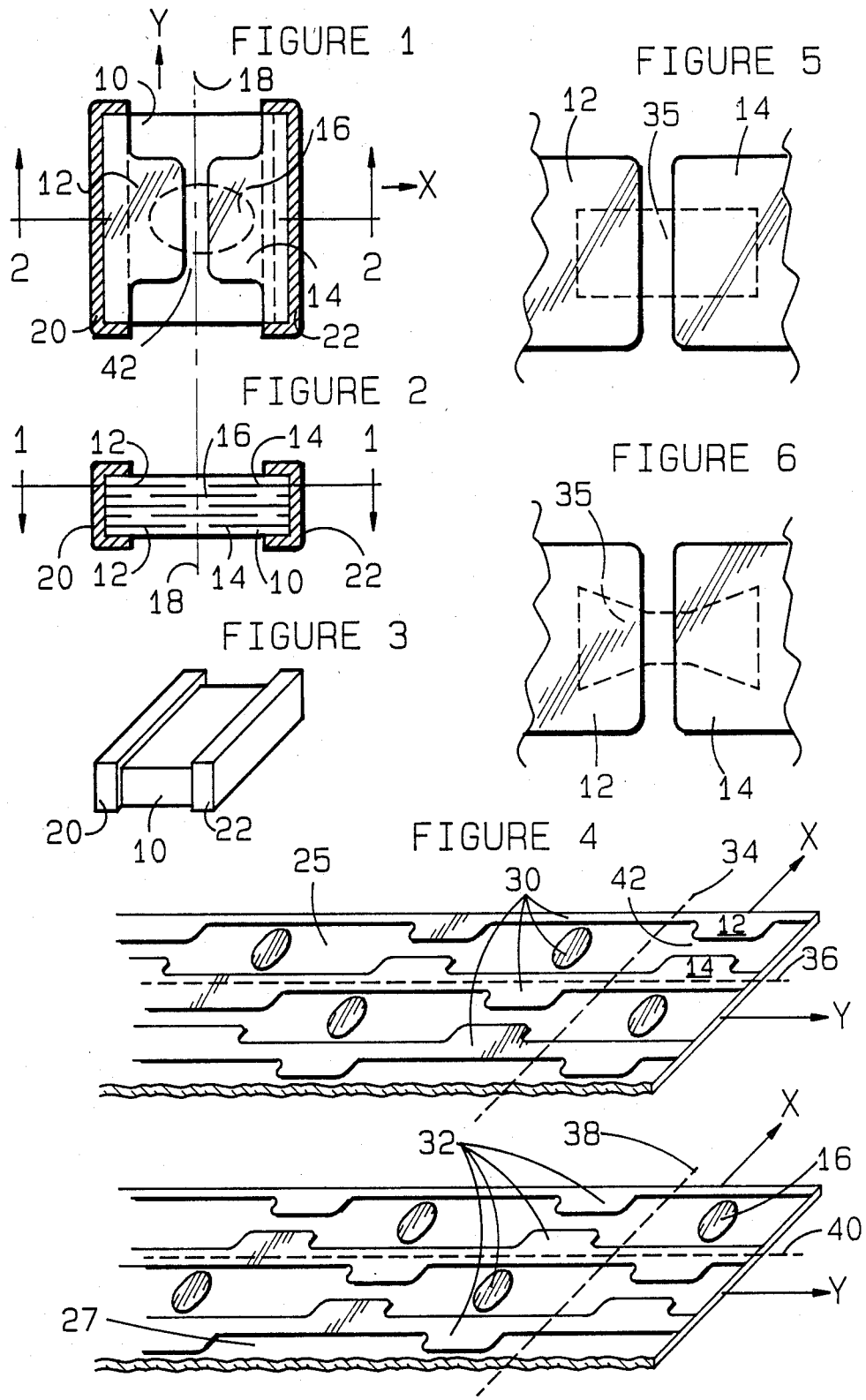

MONOLITHIC CERAMIC CAPACITOR AND METHOD FOR MANUFACTURING TO PREDETERMINED CAPACITY VALUE

BACKGROUND OF THE INVENTION

This invention relates to a monolithic ceramic capacitor having buried electrodes, at least one of which floats and overlaps two main buried electrodes that lie in a common plane, each of the main electrodes extending to separate body faces of the ceramic capacitor body to provide electrical access thereto.

There has long been a need for a stable, precise-value, low-capacity monolithic ceramic capacitor. Low-dielectric-constant (K) ceramic materials usually provide the needed stability. Such materials have a K of less than about 200. The needed small values, e.g. less than about 200 pf, are easily obtained in an inexpensive monolithic ceramic capacitor having a convenient chip geometry (right-parallelepiped) and small size, e.g. largest dimension ranging from 0.20 to 0.040 inch (5 to 1 mm). It has heretofore not been possible to manufacture such capacitors to tighter capacitance tolerances than about ±20%, i.e. the distribution of capacitance values typically has $2\sigma$ points at about ±20% of the nominal capacitance value. There is much demand for monolithic ceramic capacitors guaranteeing a particular low capacitance value ±2% or even ±1%. Only capacitors that are found by testing to meet these limits can be supplied to such purchase specifications.

With rare exception, monolithic chip capacitors include a first group of mutually-parallel buried electrodes extending to one body face for electrical access, and a second group of mutually-parallel, buried electrodes interdigitated with the first group and extending to another body face. In most such capacitors, the adjacent electrodes are of the same dimensions and are meant to be registered one directly over the other. Any misregistration of those adjacent electrodes in manufacturing causes a commensurate deviation from the nominal capacity value of the finished capacitor, i.e. an elecrodes misregistration of 5%, which is substantially more than is usually allowed, leads to a capacity change of 5%. It would therefore be possible to purposefully offset the registration between adjacent electrode patterns to adjust the capacity value to a desired value, but that would be of small practical value for capacitors of small capacity value since the degree to which registration can be maintained is inversely proportional to the overlap areas of adjacent electrodes.

This precision-degrading factor can be eliminated by using a floating electrode and adjusting the relative geometries of adjacent electrodes as described in my patent, U.S. Pat. No. 3,896,354 issued July 22, 1975 and assigned to the same assignee as is the present invention. In one example, a floating electrode in one plane has a fixed overlap with each of two other electrodes in an adjacent plane that extend to opposite body faces. Relative movement between the electrode patterns in each of the two planes has no effect on the capacity between them. This technique, however, does not solve the problem of how to manufacture close tolerance capacitors to a predetermined nominal capacity value.

That has been accomplished in the past by adjusting the capacity value after the capacitor had been through the sintering and termination steps. In one case a pattern of very small electrode strips has been interposed between at least one pair of adjacent main electrodes that extend to a first terminal face of the body. The small interposed strips extend to a third face and are connected as needed to the main electrodes extending to the second face to adjust the capacity value upward. In another case the finished capacity body is abraded to dig a cavity in a central portion of the body to penetrate and remove at least a portion of the outermost buried electrode or electrodes to effect a downward capacity adjustment. This method is described by Hatch in U.S. Pat. No. 3,456,170, issued July 15, 1969 and assigned to the same assignee as is the present invention. However, making adjustments in capacity for very small chips in accordance with these methods is just not practical, and even for larger chips it would be advantageous to make the capacitors to the desired nominal capacity value in the first place and avoid the extra steps and costs involved in such methods of capacity adjustment.

It is therefore an object of this invention to provide a monolithic ceramic capacitor that can be manufactured to tight capacitance tolerances.

It is a further object of this invention to provide a method by which such capacitors can be made.

SUMMARY OF THE INVENTION

A monolithic ceramic capacitor having a ceramic body of right-parallelepiped shape and containing a pair of coplanar buried electrodes each extending to opposite body faces for electrical access, has a third buried electrode that is not accessible electrically and thus floats in a plane spaced from but parallel to the plane of the pair of electrodes. The floating electrode overlaps each of the electrodes of the pair. The area of overlap with a first electrode of the pair is greater than the area of overlap with the second electrode of the pair.

Equal areas of overlaps would produce the maximum possible capacitance value. In this construction, it is possible to simply adjust the registration of the floating electrode relative to the pair of electrodes to adjust the capacitance of the finished capacitor to a desired value. This process has the highly significant advantage that a large change in registration produces a small change in the capacitance value. Thus, the precision with which adjustment in capacitance value can be made is much greater than the precision with which electrodes-registration can be established.

BRIEF DESCRIPTION OF THE DRAWINGS

FIG. 1 shows a capacitor of this invention taken in top sectional view in a plane 1—1.

FIG. 2 shows the capacitor of FIG. 1 but taken in side sectional view in plane 2—2.

FIG. 3 shows the capacitor of FIGS. 1 and 2 in perspective view.

FIG. 4 shows in exploded view two green-ceramic sheets that carry patterns of electrode-etch films, which sheets may be stacked to make a plurality of the capacitors shown in FIGS. 1 through 3.

FIG. 5 shows in top sectional view a detail of the capacitor of FIG. 1 except modified by having floating electrodes of a rectangular shape.

FIG. 6 shows in top sectional view a detail of the capacitor of FIG. 1 except modified by having floating electrodes of yet another shape.

DESCRIPTION OF THE PREFERRED EMBODIMENTS

The monolithic ceramic capacitor depicted in FIGS. 1, 2 and 3 includes a dielectric ceramic body 10 that has the shape of a right-parallelepiped. Three pairs of main electrodes 12 and 14 are buried in the body 10 and extend to a left and right hand body surface. Sandwiched between each adjacent pairs of the main electrodes 12 and 14 is a floating electrode 16. The floating electrodes 16 are offset to the right relative to the plane of symmetry 18 established by the main electrodes 12 and 14 as is seen in FIGS. 1 and 2. Conductive terminations 20 and 22 are bonded to the above mentioned left and right hand body faces and make contact to main electrodes 12 and 14, respectively.

A ceramic slurry was prepared by dispersing a green dielectric ceramic powder in a mixture of xylene, a butylmethacrylate binder and amyl acetate, as is described in more detail by Hurley et al in U.S. Pat. No. 3,717,487 issued Feb. 20, 1973 and assigned to the same assignee as is the present invention. The ceramic powder is one of the barium titanate powders mixed with a glass that is described by Maher as A-3 in U.S. Pat. No. 3,885,941 issued May 27, 1975 and assigned to the same assignee as is the present invention. The powder is pulverized so that the powder paritcle sizes are less than 2 microns.

A flat substrate having a porous paper cover layer is passed through a continuously falling sheet of the ceramic slurry. The slurry has a viscosity of about 1000 centipoise. The substrate is repassed through the falling sheet until a build-up of 4 to 6 mils (0.1 mm to 0.15 mm) is obtained. The build-up is then dried to remove the xylene, and amyl acetate solvents.

An electroding ink, comprising a fine powder of a silver/palladium alloy and an organic vehicle is selectively screen printed in a matrix pattern of ink film patches onto the surface of the green ceramic build-up. The substrate is then passed again through the falling ceramic-slurry sheet, dried and screen printed with another pattern of ink patches registered with the underlying first one. This sequence is repeated until the stack contains a desired number N of "active dielectric layers" and N+1 electrode patterns. Then a few more passes under the falling sheet are made without more electroding ink to complete the stack.

During the application of each successive ceramic layer, the stack is maintained at a temperature of between about 55° to 80° C. to facilitate removal from each layer of the solvents in the ceramic as well as those in the ink.

The substrate carrying the completed stack is mounted on a table that is horizontally movable in perpendicular X-Y directions. The cake is subsequently diced into a plurality of green ceramic capacitor bodies each having the shape of a right parallelepiped. The dicing is accomplished by sequentially pushing a knife into the cake and indexing the table in first an X-direction and then a Y-direction.

Index holes in the substrate or marks of another kind make it possible to register the above-noted successive ink pattern with each other as well as to register the knife cuts at dicing with the buried electroding-ink patterns. Such registrations can with great care be made to a tolerance of 1 mil (0.025 mm).

Referring to FIG. 4, two green ceramic sheets 25 and 27 carry ink patterns 30 and 32 respectively. A portion of each of these two sheets have been shown in exploded view to show how the two ink patterns 30 and 32 are registered to form the capacitor of FIGS. 1 and 2. Other green sheets needed to complete the green cake are omitted being repetitive and not necessary for a full understanding of this structure. Dashed lines 34 and 36 show the locations of the dicing that will isolate the upper right hand corner segment of sheet 25 carrying main electrodes 12 and 14. Likewise, dashed lines 38 and 40 show the corresponding locations, respectively, of the same dicing cuts that will isolate the upper right hand corner of sheet 27 carrying a floating electrode 16.

In the following discussion of the electrodes geometry, the electrode widths will be taken in the vertical or Y-direction as seen in FIG. 1, and the lengths of the electrodes in the horizontal or X-direction.

The width of the floating electrodes 16 are less than the widths of the main electrodes 12 and 14 (FIG. 1) so that misregistration in a Y-direction between the ink patterns 30 and 32 of adjacent sheets 25 and 27 (FIG. 4), respectively, will result in no change in the areas of electrodes overlap (FIG. 1) and thus no change in capacity as measured between electrodes 12 at termination 20 and electrodes 14 at termination 22 (FIG. 3). This feature follows the principles developed in the aforementioned patent U.S. Pat. No. 3,896,354.

The floating electrodes 16 are intentionally offset in the X-direction (FIG. 1) from the plane of symmetry 18 so that the area of overlap between the floating electrodes 16 and main electrode 14 is greater than the area of overlap between the floating electrodes 16 and the main electrode 12. The capacitance as measured between terminations 20 and 22 is smaller than it would have been if the floating electrode were positioned symmetrically with respect to plane 18 whereby the overlap areas with main electrodes 12 and 14 would be equal.

Floating electrodes in prior art capacitors are designed to have equal overlap areas with cooperating main electrodes to minimize voltage stress, optimize the capacity value and more generally to achieve a greater figure of merit, namely an optimum volt-microfarad-product per unit volume occupied by the capacitor.

This invention recognizes the principle that by controllably adjusting the offset of floating electrodes in a monolithic ceramic capacitor, a fine adjustment in overall capacity can be achieved, and furthermore this adjustment is just as effective and practical to make in a capacitor with only one floating electrode as it is in a "multistory" capacitor having many floating electrodes. It is also possible to adjust the offset of just one among many floating electrodes in a capacitor of this invention.

The changes in overall capacity that are effected by different amounts of electrode offset are surprisingly small. For example, using the geometry of FIG. 1 and assuming the gap 42 between the main electrodes is 30 mils (0.76 mm), the length of the floating electrode is 90 mils (2.29 mm), the width is 60 mils (1.52 mm) and the semicircular regions have a radius of 30 mils (0.76 mm), then a 3 mil (0.076 mm) displacement (offset) of the floating electrode in the X-direction will cause the capacity (corresponding to one area of overlap) with the main electrode 14 to increase by 13% and the capacity (corresponding to the other area of overlap) with the main electrode 12 to decrease by 13%. But at the same time, the overall capacity is adjusted downwardly by only 1.75%.

If the rectangular floating electrode 35 shown in FIG. 5 is substituted for the floating electrode 16 of FIG. 1, then assuming the length and width are still 90 and 60 mils, respectively, the 3 mil displacement of electrode 35 gives about the same result.

However, other changes in the shape of the floating electrode, or for that matter changes in the shapes of the main electrodes, can modify the relationship between extent of electrode displacement and change in the capacity. For example, FIG. 6 shows a floating electrode 39 substituted for the floating electrode 16 of FIG. 1. Floating electrode 39 has the same maximum length and width but has a shape that even further reduces the change in capacity as a function of displacement, i.e. at 3 mils displacement, the capacity is changed 1.3% and at 6 mils displacement the capacity is changed 1.7%.

What is claimed is:

1. A monolithic ceramic capacitor comprising a ceramic body substantially of right-parallelepiped shape, first and second buried electrodes lying in one plane within said body and being separated from each other by a gap about in the middle of said body, each of said first and second electrodes extending outward to opposite faces of said body for electrical access thereto, a third and floating buried electrode not extending to a body face and lying in another plane that is spaced from and parallel to said one plane, the area of overlap between said floating and first electrodes being greater than the area of overlap between said floating and said second electrodes.

2. The capacitor of claim 1 wherein the width of said floating electrode, taken at about right angles to said gap, is less than that of said first and second electrodes, said first and second electrodes being registered with said floating electrode so as to extend in directions of said width beyond said floating electrode.

3. The capacitor of claim 1 wherein the width of a region of said floating electrode decreases in a length direction going away from said gap.

4. The capacitor of claim 1 wherein the width of a region of said floating electrode increases in a length direction going away from said gap.

5. The capacitor of claim 1 wherein the displacement of more than 2% in a lengthwise direction of said floating electrode is relative to said first and second electrodes would be required to render said two overlap areas equal.

6. The capacitor of claim 1 wherein the dielectric constant of said ceramic body is less than 200.

7. A method for making a monolithic ceramic capacitor comprising building a green ceramic body having the shape of a parallelepiped by a process including depositing a first and second film of electroding ink on a rectangular portion of a green ceramic layer with a gap between said first and second ink films, depositing a thin sheet of said green ceramic material onto said inked layer, depositing a third film of electroding ink on said thin sheet in a position producing unequal areas of overlap th said first and second films that is predicted to give a desired capacitance of said ceramic capacitor, and covering said inked sheet with another layer of said green ceramic material and firing said ceramic body to maturity.

8. The method of claim 7 additionally comprising after depositing said third ink film, depositing a plurality of additional thin sheets of said green ceramic material and on successive ones of said additional sheets depositing alternately a pair of ink films identical to and registered directly over said first and second ink films and a single ink film identical to and registered directly over said third ink film.

9. The method of claim 7 additionally comprising after depositing said third ink film, depositing a plurality of additional thin sheets of said green ceramic material and on successive ones of said additional sheets depositing alternately a pair of ink films identical to and registered directly over said first and second ink films and a single ink film identical to and registered over said first and second ink films to provide substantially equal overlapping areas therewith.

10. A method for making a plurality of monolithic ceramic capacitors having a narrow distribution of capacitance values about a nominal value comprising:
    (a) depositing on a layer of green ceramic material a matrix of electroding-ink-film pairs;
    (b) applying a thin sheet of said green ceramic material to said inked layer;
    (c) depositing a matrix of electroding-ink-film patches on said thin sheet registering each of said patches over one of said pairs to form an area of overlap with one film of said one pair that is greater than the area of overlap formed with the other film of said one pair;
    (d) depositing another layer of said green ceramic layer over said inked sheet;
    (e) dicing the stack of green ceramic sheet and layers into a plurality of bodies having the shape of a right-parallelepiped, said dicing being registered with said electroding-ink-film pairs to cause one of each electroding-ink-film pair to extend to one body face and the other to extend to the opposite body face while said patches are caused to remain wholly within and not extend to a body face;
    (f) firing said bodies to convert said electroding-ink-films to conducting-film electrodes, and to mature said ceramic.

11. The method of claim 10 additionally comprising applying a conductive termination to each of said one body face and to each of said opposite body faces, to contact and electrically connect together said electrodes of said pair that extend to one and another faces, respectively.

12. The method of claim 11 additionally comprising a registering said electrode pairs, resulting from said repeating of step (10), directly over each other.

13. The method of claim 12 additionally comprising measuring the capacitance of at least one of said sintered capacitor bodies between said one and said other electrodes, and adjusting said registering of each of said patches to adjust the capacitance values of all successively made capacitors to a specified value.

14. The method of claim 10 additionally comprising after said depositing of said matrix of said ink patches, repeating steps (a), (b) and (c) a number of times.

15. The method of claim 10 wherein said depositing of said layers and applying of said sheet of green ceramic material are accomplished by repeatedly passing a substrate through a falling sheet of a slurry of green ceramic powder.

* * * * *